United States Patent

Erkfritz

[11] 4,078,868
[45] Mar. 14, 1978

[54] CUTTER HAVING INSERTS CLAMPED WITH WEDGES

[75] Inventor: Donald S. Erkfritz, Clarkston, Mich.

[73] Assignee: The Ingersoll Milling Machine Company, Rockford, Ill.

[21] Appl. No.: 784,969

[22] Filed: Apr. 6, 1977

[51] Int. Cl.² ............................................. B26D 1/12
[52] U.S. Cl. .................................... 407/48; 407/49; 407/104; 407/108; 407/41; 408/233
[58] Field of Search .......................... 29/105 R, 105 A; 408/233, 153

[56] References Cited

U.S. PATENT DOCUMENTS

| | | | |
|---|---|---|---|
| 2,751,663 | 6/1956 | Leuzinger | 29/105 A |
| 2,945,288 | 7/1960 | Berry, Jr. | 29/105 R |
| 3,467,416 | 9/1969 | Gourley | 29/105 R |

FOREIGN PATENT DOCUMENTS 872,693  7/1961  United Kingdom .............. 29/105 R Primary Examiner—Leonidas Vlachos
Attorney, Agent, or Firm—Leydig, Voit, Osann, Mayer & Holt, Ltd.

[57] ABSTRACT

A cutting insert is disposed in a pocket formed in a cutter body and having a side wall and an angularly related bottom wall. A first wedge engages one face of the insert and includes a pin which extends into a hole in the insert. A second wedge engages the first wedge and, when the second wedge is shifted inwardly, the first wedge clamps a face of the insert against the side wall of the pocket while the pin clamps the inner edge portion of the insert against the bottom wall of the pocket.

4 Claims, 4 Drawing Figures

U.S. Patent  March 14, 1978  4,078,868
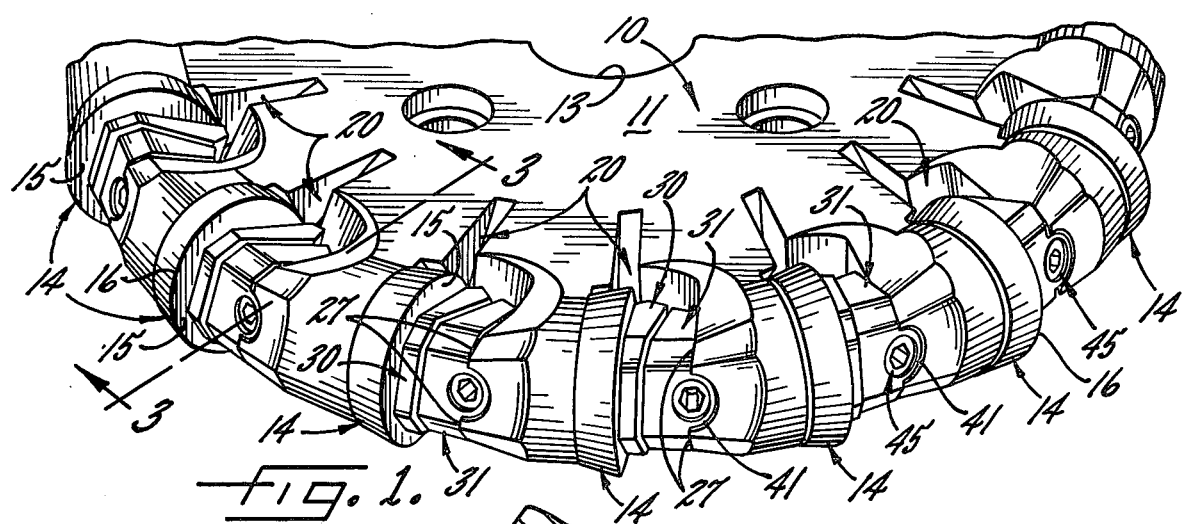
Fig. 1.
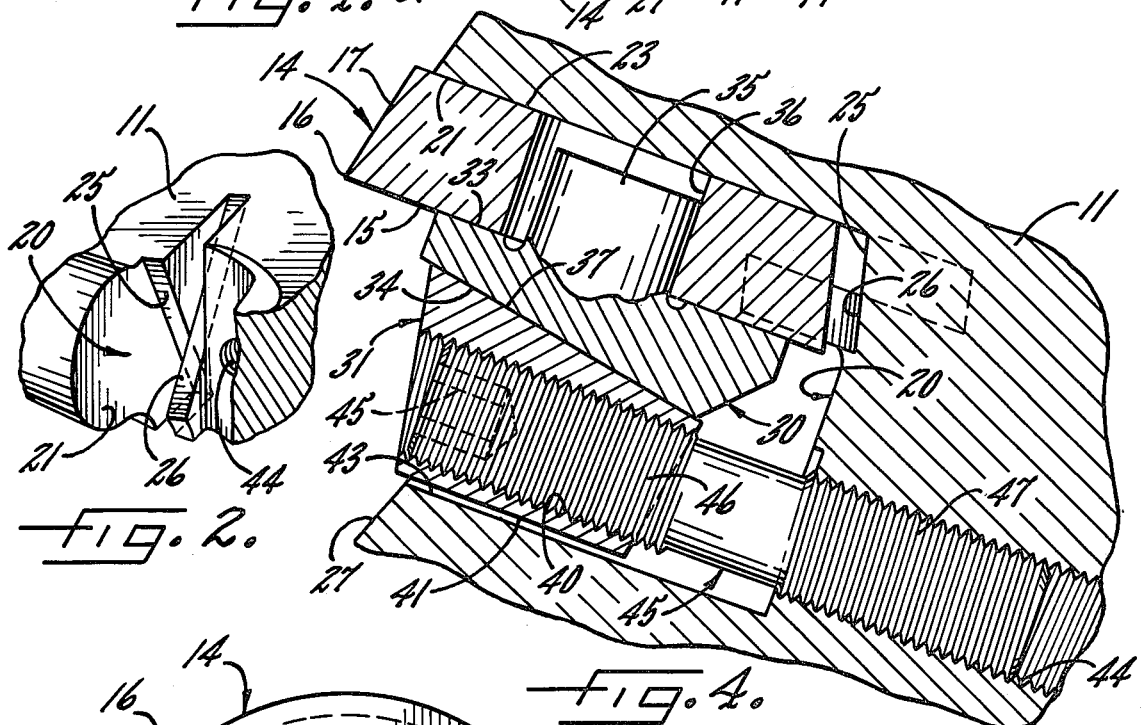
Fig. 2.
Fig. 4.
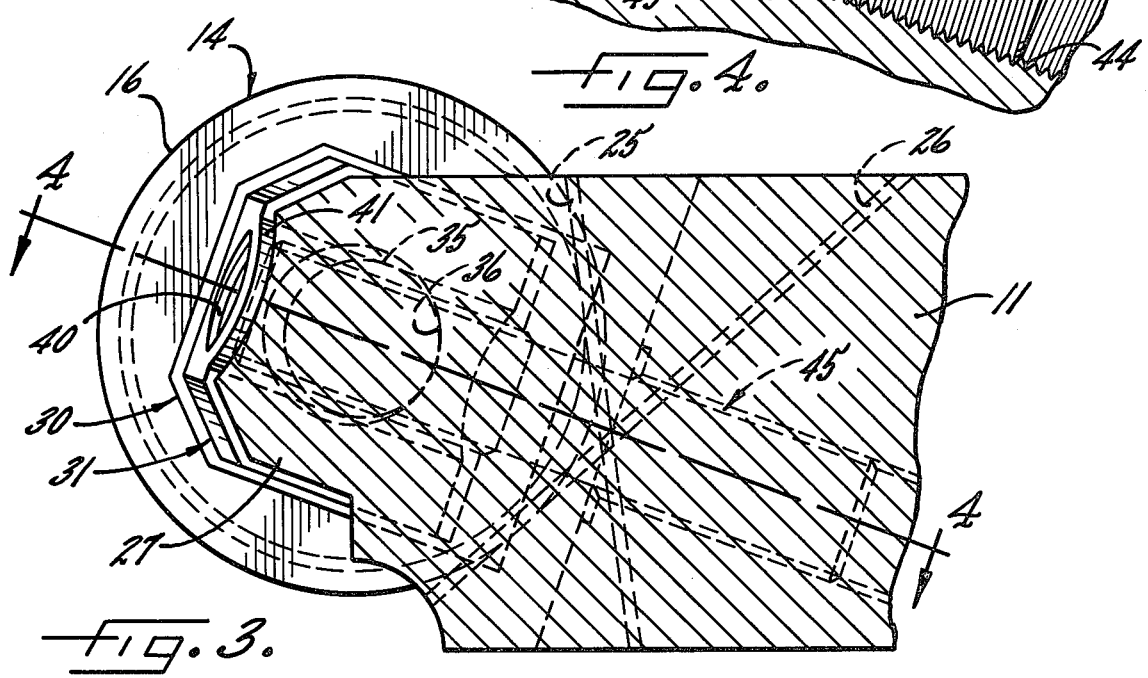
Fig. 3.

CUTTER HAVING INSERTS CLAMPED WITH WEDGES

BACKGROUND OF THE INVENTION

This invention relates to a cutting tool having a body which is formed with one or more pockets adapted to receive inserts made of cutting material. More specifically, the invention relates to a cutting tool in which each pocket is defined by a side wall and by an angularly related bottom wall. One face of the insert is adapted to be clamped against the side wall of the pocket while the edge of the insert is adapted to be clamped against the bottom wall of the pocket in order to hold the insert in the pocket.

SUMMARY OF THE INVENTION

The general aim of the present invention is to provide a new and improved cutting tool having unique means which insure that the insert will be clamped very securely against both the side wall and the bottom wall of the pocket even though the face and edge of the insert move into full engagement with the side and bottom walls, respectively, at different times, such secure clamping serving to prevent the insert from shifting out of the pocket.

A further object is to provide clamping means which serve as a safety lock to prevent both the cutting insert and the clamping means itself from flying away from the cutter in the event the clamping means becomes loose during the cutting operation.

A more detailed object is to achieve the foregoing by providing clamping means in which a first wedge engages one face of the insert and includes a projection which extends into a hole in the insert. A second wedge engages the first wedge and, when one wedge is shifted into wedging engagement with the other wedge, the first wedge clamps a face of the insert against the side wall of the pocket while the projection clamps the edge of the insert against the bottom wall of the pocket.

The invention also resides in the use of such wedges for clamping circular inserts in substantially V-shaped pockets to prevent the inserts from rolling out of the pockets even though each insert is cutting along its entire exposed arc, the wedges also enabling a relatively large number of inserts to be positioned around a cutter body of given diameter.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a new and improved cutter incorporating the novel features of the present invention.

FIG. 2 is a fragmentary perspective view showing one of the pockets for the inserts.

FIG. 3 is an enlarged fragmentary cross-section taken substantially along the line 3—3 of FIG. 1.

FIG. 4 is a fragmentary cross-section taken substantially along the line 4—4 of FIG. 3.

DETAILED DESCRIPTION OF THE PREFERRED EMBODIMENT

As shown in the drawings for purposes of illustration, the invention is embodied in a milling cutter 10 having a substantially circular body 11 adapted to be rotated in a counterclockwise direction about a predetermined axis defined by the axis of a central hole 13 formed through the body and adapted to receive a rotatably driven spindle (not shown). Several inserts 14 made of tungsten carbide or other suitable high speed cutting material are spaced angularly around the periphery of the body and are adapted to mill a workpiece as the cutter is rotated and fed radially. In the presence instance, each insert is circular in shape and includes a flat leading cutting face 15 (FIG. 4), an arcuate cutting edge 16 and a beveled clearance face 17. Each cutting edge is capable of cutting along an arc of approximately 240° and thus the present cutter is especially suited as a bucket mill for profiling turbine vanes or the like.

Each of the inserts 14 is located within a pocket 20 (FIG. 2) which opens radially out of the periphery of the body 11 and which extends axially from one side of the body to the opposite side thereof. Herein, each pocket is defined by a substantially circumferentially facing trailing side wall 21 which supports and locates the trailing or inactive face 23 of the insert 14. In addition, each pocket includes a bottom wall which faces in a substantially radial direction and which, in the present instance, is defined by two oppositely inclined rails 25 and 26 (FIG. 2). The rails are formed by suitably milling the cutter body 11 and are located so as to form a substantially V-shaped seat for supporting and locating the innermost or inactive peripheral edge portion of the insert 14. Each pocket 20 is completed by a substantially circumferentially facing leading side wall 27 (FIG. 1) which is spaced ahead of the insert with respect to the direction of rotation of the cutter 10.

In accordance with the present invention, each insert 14 is clamped securely against the side wall 21 and the bottom wall 25, 26 of its respective pocket 20 by a uniquely constructed wedge 30 (FIG. 4) which coacts in a novel manner with a second wedge 31 to clamp the insert against both walls even though the insert might fully seat against one wall before seating against the other wall. Moreover, the two wedges coact with one another to prevent both the wedges and the cutting insert from flying away from the cutter body 11 in the event that one of the wedges becomes loose during the cutting operation.

More specifically, the wedge 30 is located in the pocket 20 adjacent the leading face 15 of the insert 14 and is positioned with its inner end spaced radially outwardly from the bottom of the pocket so that radial clearance exists between the wedge and the bottom of the pocket. The trailing surface 33 of the wedge 30 is flat and is disposed in the same plane as the leading face 15 of the insert, the wedge thus being disposed in face-to-face engagement with the insert. The leading surface 34 of the wedge 30 diverges away from the insert upon progressing inwardly and thus such surface defines an inclined wedge surface.

In carrying out the invention, a projection 35 (FIG. 4) is rigid with the trailing surface 33 of the wedge 30 and extends into a hole 36 formed through the insert 14 at the center thereof. As the wedge 30 is shifted into clamping engagement with the leading face 15 of the insert, the projection 35 engages the inner side or bottom of the hole 36 and clamps the inner edge portion of the insert to the bottom wall 25, 26 of the pocket 20. Herein, the projection 35 is in the form of a cylindrical pin whose diameter is significantly less than the diameter of the hole 36, the latter also being cylindrical. As a result, the pin 35 may seek line contact with the bottom of the hole 36.

The wedge 31 is disposed within the pocket 20 between the wedge 30 and the leading wall 27 of the pocket and includes an inwardly inclined wedge surface 37 (FIG. 4) which mates face-to-face with the wedge surface 34 of the wedge 30. The opposite surface of the wedge 31 is located in the same plane as the leading wall 27 of the pocket and is disposed in engagement with that wall while the inner end of the wedge is spaced radially from the bottom of the pocket.

An internally threaded and inwardly extending hole 40 (FIG. 4) is formed through a semi-circular boss 41 which protrudes from the leading surface of the wedge 31 and which is received in a recess 43 formed in the leading wall 27 of the pocket 20. The hole 40 is alined with another threaded hole 44 which is formed in the cutter body 11 at the bottom of the pocket. Extending into the two holes is a screw 45 having threaded end portions 46 and 47 of opposite hands threaded in the holes 40 and 44, respectively. By inserting a suitable tool into a recess 45 in the outer end of the screw, the latter may be turned in one direction or the other to either shift the wedge 31 inwardly into wedging engagement with the wedge 30 or to shift the wedge 31 outwardly and thereby release the wedge 31 from the wedge 30.

When the wedge 31 is shifted inwardly by tightening the screw 45, the wedge surface 37 wedges against the wedge surface 34 of the wedge 30 and forces the latter wedge rearwardly and inwardly. As a result, the trailing surface 33 of the wedge 30 forces the insert 14 rearwardly against the trailing wall 21 of the pocket 20 and the insert thus becomes clamped between the wedge 30 and the trailing wall. In addition, the pin 35 on the wedge 30 is forced inwardly against the bottom of the hole 36 in the insert and serves to clamp the insert against the bottom wall 25, 26 of the pocket 20. If the insert should happen to be clamped against the trailing side wall 21 before being fully clamped against the bottom wall 25, 26, continued tightening of the screw and continued inward shifting of the wedge 31 forces the wedge 30 inwardly until the pin 35 causes the insert to seat against the bottom wall. Similarly, the wedge 31 will continue to shift the wedge 30 rearwardly if the pin 35 causes the insert to become fully seated against the bottom wall 25, 26 before the insert is clamped to the side wall 21. Such rearward shifting insures that the insert will be securely clamped to the side wall.

From the foregoing, it will be apparent that the two wedges 30 and 31, the pin 35 and the hole 36 coact in a unique manner to effect secure clamping of the insert 14 to both the side wall 21 and the bottom wall 25, 26 of the pocket 20. Accordingly, the insert is retained securely in the pocket and is prevented from rolling out of the pocket even when cutting forces are being imposed on the insert around substantially two-thirds of the circumference thereof. Also, the two wedges 30 and 31 are comparatively compact in a circumferential direction and thus enable a relatively large number of inserts to be located around a cutter body 11 of a given diameter.

Even if the screw 45 should become loose during the cutting operation, the insert 14 and the wedges 30 and 31 are captivated against flying out of the cutter body 11. If the screw loosens, the wedge 31 may shift outwardly but, as the wedge 30 attempts to shift outwardly, it re-wedges against the wedge 31 and is retained in the pocket 20. The pin 35 retains the insert in the pocket and thus neither the insert nor the wedges may leave the pocket unless the screw is completely released.

While the wedges 30 and 31 have been disclosed specifically in conjunction with a circular insert 14, those familiar with the art will appreciate that the wedges could be used to clamp inserts of other shapes. Also, clamping of the insert could be effected by providing a wedge 30 having a wedging surface inclined oppositely of the wedging surface 34 and by using a screw 45 to shift such wedge inwardly relative to a stationary wedging surface inclined oppositely of the wedging surface 37. Such a wedge, however, would not re-wedge in the pocket 20 in the event the screw became loose.

I claim:

1. A cutter having a body adapted to be rotated about a predetermined axis, a series of pockets spaced around and opening out of the periphery of said body, each of said pockets having a substantially circumferentially facing trailing wall and having a substantially radially facing bottom, a cutting insert disposed in each of said pockets, each of said inserts having one face disposed in engagement with the wall of said pocket and having an edge disposed in engagement with the bottom of said pocket, a hole formed in said insert and opening out of the opposite face thereof, a first wedge having one surface disposed in engagement with said opposite face of said insert and having an opposite surface defining a wedge surface which diverges away from said insert upon progressing inwardly, a projection rigid with said one surface of said first wedge and projecting into said hole, a second wedge having a wedge surface adapted to engage the wedge surface of said first wedge, and means connected between said second wedge and said body and selectively operable to shift said second wedge inwardly into wedging engagement with said first wedge to cause said first wedge to clamp said insert against the wall of said pocket and to cause said projection to clamp said insert against the bottom of said pocket.

2. A cutter as defined in claim 1 in which said hole and said projection are of circular cross-section, the diameter of said projection being substantially less than the diameter of said hole.

3. A cutter as defined in claim 1 in which each of said inserts is substantially circular, the bottom of each of said pockets being substantially V-shaped.

4. A cutting tool having a body with a pocket formed therein, said pocket having first and second angularly related walls, a cutting insert disposed in said pocket, said insert having one face disposed in engagement with said first wall and having an edge disposed in engagement with said second wall, a hole formed in said insert and opening out of the opposite face thereof, a first wedge disposed in engagement with said opposite face of said insert, a projection rigid with said first wedge and projecting into said hole, a second wedge adapted to engage said first wedge, and means connected between said body and one of said wedges and selectively operable to shift said one wedge into wedging engagement with the other wedge to cause said first wedge to clamp said one face of said insert against said first wall and to cause said projection to clamp the edge of said insert against said second wall.

* * * * *